United States Patent
Feng et al.

(10) Patent No.: US 10,567,932 B2
(45) Date of Patent: Feb. 18, 2020

(54) POSITIONING ADAPTER, COMMUNICATION METHOD, INDOOR POSITIONING SYSTEM AND METHOD

(71) Applicant: BOE TECHNOLOGY GROUP CO., LTD., Beijing (CN)

(72) Inventors: Feng Feng, Beijing (CN); Hui Rao, Beijing (CN); Minbiao Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/260,559

(22) Filed: Jan. 29, 2019

(65) Prior Publication Data
US 2019/0327586 A1   Oct. 24, 2019

(30) Foreign Application Priority Data
Apr. 23, 2018   (CN) .......................... 2018 1 0365886

(51) Int. Cl.
| | |
|---|---|
| *H04W 4/33* | (2018.01) |
| *H04W 4/02* | (2018.01) |
| *G05D 1/00* | (2006.01) |
| *G01C 21/20* | (2006.01) |
| *G05D 1/03* | (2006.01) |
| *H04W 4/80* | (2018.01) |

(52) U.S. Cl.
CPC ............ *H04W 4/33* (2018.02); *G01C 21/206* (2013.01); *G05D 1/005* (2013.01); *G05D 1/03* (2013.01); *H04W 4/025* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 2007/0075133 | A1* | 4/2007 | Yeager | ..................... H04L 63/08 235/380 |
| 2012/0158297 | A1* | 6/2012 | Kim | ...................... G01C 21/206 701/516 |
| 2013/0095754 | A1* | 4/2013 | Moreton | ............ G06Q 20/3226 455/41.1 |

(Continued)

*Primary Examiner* — German Viana Di Prisco
(74) *Attorney, Agent, or Firm* — Brooks Kushman P.C.

(57) ABSTRACT

The present disclosure provides a positioning adapter, a communication method, an indoor positioning system and an indoor positioning method. The positioning adapter includes: a first communication circuit, an encoder, a second communication circuit and an adaptation interface. The first communication circuit is configured to receive position information, and send the position information as well as identity information to the encoder. The encoder is configured to receive the position information and the identity information, obtain encoded information that matches the smart device by encoding the position information and the identity information, and send the encoded information to the second communication circuit. The second communication circuit is configured to receive the coded information and transmit the coded information to the smart device through the adaptation interface. The adaptation interface is configured to connect the positioning adapter with the smart device, and communicate with the smart device through the second communication circuit.

20 Claims, 7 Drawing Sheets

(56) References Cited

U.S. PATENT DOCUMENTS

| | | | |
|---|---|---|---|
| 2013/0149962 A1* | 6/2013 | Kim | H04B 5/0025 |
| | | | 455/41.1 |
| 2013/0288598 A1* | 10/2013 | Parkin | G06F 1/1626 |
| | | | 455/41.1 |
| 2014/0336920 A1* | 11/2014 | Burrell | G01C 21/206 |
| | | | 701/409 |
| 2017/0010811 A1* | 1/2017 | Sato | G06Q 30/02 |
| 2019/0082297 A1* | 3/2019 | Poda | H04W 4/024 |

\* cited by examiner

POSITIONING ADAPTER, COMMUNICATION METHOD, INDOOR POSITIONING SYSTEM AND METHOD

CROSS-REFERENCE TO RELATED APPLICATION

This application claims priority to Chinese Patent Application No. 201810365886.8, filed on Apr. 23, 2018, which is incorporated herein by reference in its entirety.

TECHNICAL FIELD

The present disclosure relates to the field of indoor positioning technologies, and in particular to a positioning adapter, a communication method, an indoor positioning system and an indoor positioning method.

BACKGROUND

Currently, with development of smart medical care, the medical industry will also face digital problems. Queuing problems and departmental guidance problems that were previously criticized may be solved by digital means. For example, in the hospital, although toll windows are spread all over floors of the hospital, patients still don't know which floor has the lowest number of queues, so they have to take chances or go to each floor to try, which will waste a lot of time. This is especially true for medical examination centers. Because physical examinees do not know the number of queues for each project, a large number of medical doctors have to plan and guide the physical examinees, resulting in inefficiency and increasing of cost of the physical examination.

In addition, when patients are not familiar with the environment, they often don't know where they are on a map, thus it's difficult for them to easily go to a position where they want by mean of path planning, such as departments, toll offices, wardrobes or toilets where the patients often go.

SUMMARY

According to a first aspect, one embodiment of the present disclosure provides a positioning adapter capable of being connected with a smart device. The positioning adapter includes: a first communication circuit; an encoder; a second communication circuit; and an adaptation interface. The first communication circuit is configured to receive position information, and send the position information to the encoder. The encoder is configured to receive the position information, obtain encoded information that matches the smart device by encoding the position information, and send the encoded information to the second communication circuit. The second communication circuit is configured to receive the coded information and transmit the coded information to the smart device through the adaptation interface. The adaptation interface is configured to connect the positioning adapter with the smart device, and communicate with the smart device through the second communication circuit.

In one embodiment, the first communication circuit is further configured to send the position information as well as identity information to the encoder; the encoder is further configured to receive the identity information, obtain encoded information that matches the smart device by encoding the position information and the identity information, and send the encoded information to the second communication circuit.

In one embodiment, the first communication circuit is a near field communication circuit; the near field communication circuit is configured to receive position information transmitted from triggers at fixed positions and send the position information as well as identity information to the encoder.

In one embodiment, the adaptation interface is an interface configured to engage with an audio input interface.

In one embodiment, the near field communication circuit communicates through 125 KHz frequency signals.

In one embodiment, the positioning adapter further includes at least one auxiliary service circuit. The at least one auxiliary service circuit is configured to, based on at least one of the identity information and the position information, communicate with an auxiliary service device through the near field communication circuit.

In one embodiment, the auxiliary service circuit is an electronic lock.

In one embodiment, the identity information is a fixed number or user-related information written through a flashing device.

In one embodiment, the positioning adapter includes a micro control unit.

In one embodiment, the positioning adapter is powered by the smart device that is connected with the adaptation interface.

According to a second aspect, one embodiment of the present disclosure provides a communication method implemented with the above positioning adapter. The communication method includes: writing identity information into the positioning adapter, and connecting the positioning adapter with a smart device through the adaptation interface; according to change of positions of the positioning adapter, obtaining in real time position information sent from one trigger that is at a fixed position and is currently recognized by the positioning adapter; obtaining encoded information by encoding the position information and the identity information; and, sending the encoded information to the smart device through the adaptation interface.

According to a third aspect, one embodiment of the present disclosure provides a server including a map processing circuit. The processing circuit is configured to receive position information and identity information sent from a smart device, obtain a position in an indoor map corresponding to the position information via calculation, update the indoor map and send the updated indoor map to the corresponding smart device.

According to a fourth aspect, one embodiment of the present disclosure provides an indoor positioning system. The indoor positioning system includes: triggers; a positioning adapter; a smart device in communication with the positioning adapter; and a server in communication with the smart device. Each of the triggers is disposed at a fixed position in indoors and is configured to send out position information corresponding to the fixed position. The positioning adapter is configured to receive the position information transmitted from one of the triggers, and send the position information as well as identity information to the smart device that is in communication with the positioning adapter. The smart device is configured to receive the position information and the identity information transmitted from the positioning adapter, send the position information and the identity information to the server, obtain an indoor map from the server and display the position information at the indoor map. The server is configured to receive the position information and the identity information transmitted from the smart device, update the indoor map based on the position information and identity information with an updated indoor map obtained, and send the updated indoor map to the smart device. The updated indoor map includes the position information corresponding to the smart device.

In one embodiment, the system further includes a display screen. The display screen is coupled with the server; the display screen is configured to receive the indoor map sent from the server and display the indoor map.

In one embodiment, the smart device is a mobile phone; the positioning adapter is connected with the mobile phone through an audio input interface; and the mobile phone is in communication with the server.

In one embodiment, the triggers are disposed at different positions in indoors at an interval in a range of from 1.5 m to 2.5 m.

According to a fifth aspect, one embodiment of the present disclosure provides an indoor positioning method implemented with a smart device. The indoor positioning method includes: disposing several triggers at different fixed positions in indoors, wherein the triggers are configured to send out position information of the corresponding fixed positions; obtaining a positioning adapter configured with identity information of a user, and connecting the positioning adapter with the smart device of the user through an adaptation interface; according to change of positions of the user, obtaining in real time, by the positioning adapter, position information of one trigger that is currently corresponding to the user, thereby obtaining position information of the user; requesting a server for a current indoor map, and displaying the position information of the user at the indoor map.

In one embodiment, the method further includes: receiving a navigation request from the user, wherein the navigation request includes a starting position and an ending position of the user; generating navigation routes on the indoor map based on the navigation request; updating the position information of the user in the indoor map and the corresponding navigation route based on changes of positions of the user; when a distance between the position of the user and the ending position is less than a distance threshold, sending out a prompt instruction that enables a device at the ending position to send out ending position prompt information based on the prompt instruction.

In one embodiment, when a distance between the position of the user and the ending position is less than a distance threshold, sending out a prompt instruction that enables a device at the ending position to send out ending position prompt information based on the prompt instruction, includes: when the distance between the position of the user and the ending position is less than the distance threshold, sending out the prompt instruction that enables an indicator or a loudspeaker at the ending position to send out the ending position prompt information based on the prompt instruction.

According to a sixth aspect, one embodiment of the present disclosure provides an indoor positioning method implemented with the above server. The indoor positioning method includes: receiving position information of a user sent from a smart device; updating in real time an indoor map based on the position information of the user with an updated indoor map obtained, wherein the updated indoor map includes the position information corresponding to the smart device; and sending the updated indoor map to one or more smart devices.

BRIEF DESCRIPTION OF THE DRAWINGS

A brief introduction will be given hereinafter to the accompanying drawings which will be used in the description of the embodiments in order to explain the embodiments of the present disclosure more clearly. Apparently, the drawings in the description below are merely for illustrating some embodiments of the present disclosure. Those skilled in the art may obtain other drawings according to these drawings without paying any creative labor.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The following description of exemplary embodiments is merely used to illustrate the present disclosure and is not to be construed as limiting the present disclosure.

In order to solve problems of needing to queue up in different departments of hospitals, one common way is to use a Bluetooth module or a WiFi module in one mobile phone to perform indoor positioning by means of triangulation algorithm and then display in real time a position of the mobile phone indoors. However, the above way has many limitations. For example, Bluetooth and WiFi signals belong to 2.4 GHz which is an open frequency band, and many devices use this frequency band, thus the interference is serious. Further, since the Bluetooth and WiFi signals cover a large area and are unstable, they are easily occluded by people and objects. Therefore, the positioning accuracy of the above way is not high. Generally speaking, the positioning accuracy of the above way is about 3 m~5 m, which obviously cannot meet people's requirements.

Although the positioning accuracy of RFID, UWB and other technologies is relatively high, they all need special hardware equipment to support them. However, the special hardware equipment is usually not integrated in mobile phones and it's unrealistic to update the mobile phones on the market. More importantly, when mobile phone integration module is adopted, only general modules such as Bluetooth modules may be integrated by mobile phone manufacturers; however, there are problems about information security and it is not easy for hospitals or medical centers to add additional services.

In view of this, in the process of implementing the present application, the inventors have found that the related art has at least the following drawbacks: there is a lack of a quick and effective solution for indoor positioning and it is difficult to achieve comprehensive optimization in cost, accuracy, and experience.

To solves problems in indoor positioning, especially the problems of needing to queue up in different departments of the hospitals, embodiments of the present disclosure enable patients to not only know their positions accurately but also know queuing status of other patients, thereby enabling the patients to make reasonable planning according to their own medical or physical examination arrangements, or enabling the patients to accurately find less queuing departments and then improving efficiency. In addition, the current high-precision positioning way requires not only the special hardware devices to support, but also cannot ensure information security and device expansion. Therefore, the embodiments of the present disclosure provides a positioning adapter that can be applied in common intelligent devices and cooperate with a certain number of triggers at fixed positions indoors to enable users to achieve accurate indoor positioning. Details will be described hereinafter.

Figure 1:
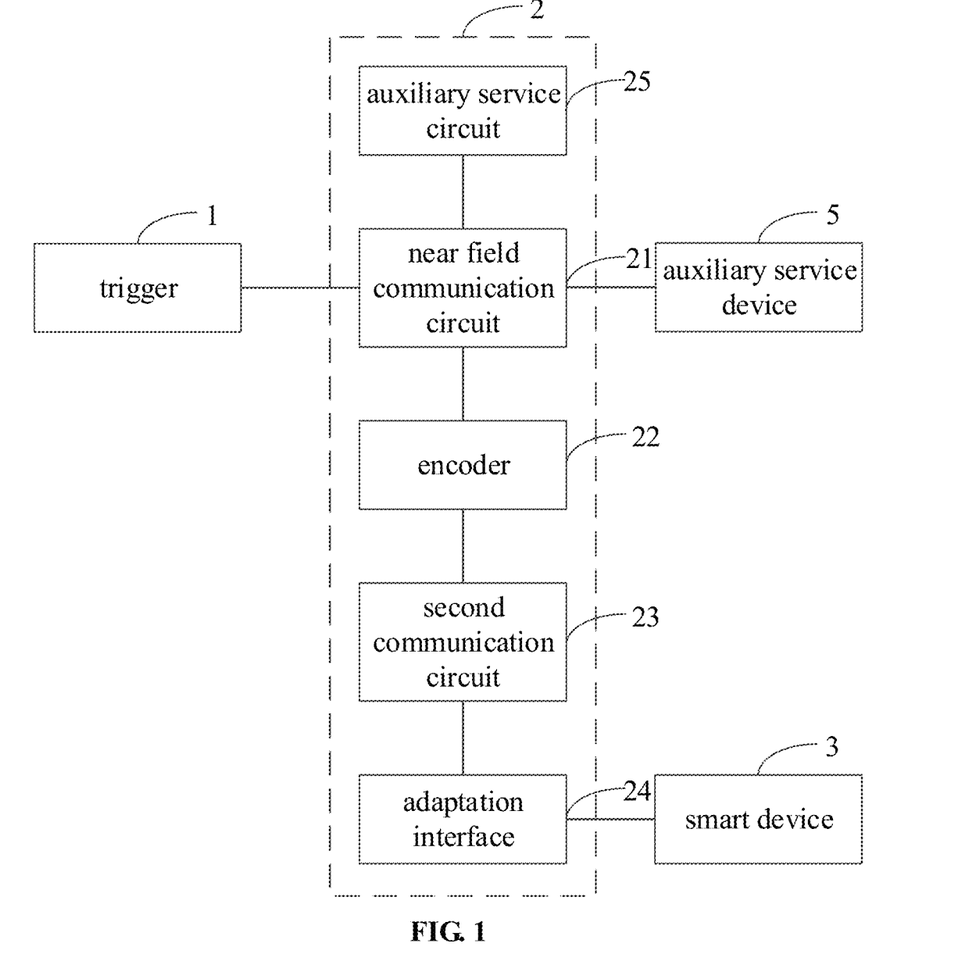
FIG. 1 is a schematic diagram of a positioning adapter according to an embodiment of the present disclosure.

FIG. 1 is a schematic diagram of a positioning adapter according to an embodiment of the present disclosure. As shown in FIG. 1, the positioning adapter 2 includes a first communication circuit such as a near field communication circuit 21, an encoder 22, a second communication circuit 23 and an adaptation interface 24.

The near field communication circuit 21 is configured to receive position information transmitted from triggers 1 at fixed positions, and send the received position information as well as pre-configured identity information to the encoder 22. Optionally, the identity information may be a pre-fixed number or user-related information written through a flashing device. In other words, the identity information may be a serial number that is similar to a queuing code in a bank queue, and specifies that one positioning adapter with the serial number is bound to an identity of a current user; or, the identity information may include the user's name, medical record, etc. written into the near field communication circuit 21. It should be noted that the near field communication circuit 21 has a near field communication module capable of communicating with other near field communication devices. Optionally, the near field communication circuit may be implemented by means of RFID, NFC or UWB, etc.

The encoder 22 is configured to receive the position information and the identity information sent from the near field communication circuit 21, obtain encoded information that matches a smart device 3 by encoding the position information and the identity information, and send the encoded information to the second communication circuit 23. Since there are certain format requirements for a communication channel accessed by the smart device which is connected with the positioning adapter, the position information and the identity information need to be processed by the encoder 22 to obtain the encoded information in a format that can be transmitted. For example, when the positioning adapter is mounted in a headphone jack of a mobile phone, the position information and the identity information need to be converted into an audio signal for transmission.

The second communication circuit 23 is configured to receive the coded information sent from the encoder 22, and transmit the coded information to the smart device 3 through the adaptation interface 24.

Figure 3:
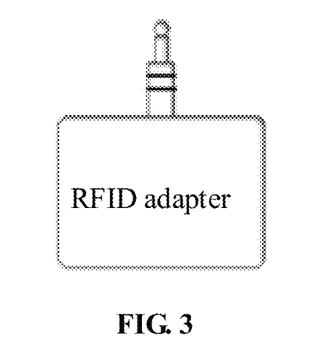
FIG. 3 is a schematic diagram of a positioning adapter according to an embodiment of the present disclosure.

The adaptation interface 24 is configured to connect the positioning adapter 2 with the smart device 3, and communicate with the smart device 3 through the second communication circuit 23. Optionally, the adaptation interface may be an interface corresponding to an audio input interface (i.e., an aux interface). FIG. 3 is a schematic diagram of an example of the positioning adapter. As shown in FIG. 3, when the adaptation interface is the audio input interface, the positioning adapter may be provided with a structure similar to an insertion end of an earphone, for being connected with the smart device such as a mobile phone. Of course, according to different actual usage environments, interfaces of other types may also be used, such as a charging interface for devices.

Optionally, the smart device 3 includes but not limited to a mobile phone, a tablet computer or other terminal devices.

Figure 4:
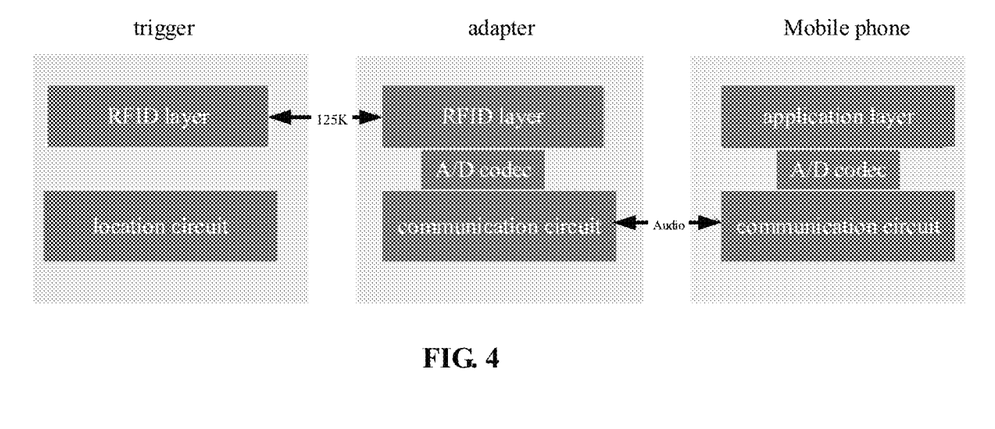
FIG. 4 is a schematic diagram showing a principle of communication between the positioning adapter and a trigger as well as a mobile phone according to an embodiment of the present disclosure.

FIG. 4 is a schematic diagram showing a principle of communication between the positioning adapter and a trigger as well as a mobile phone according to an embodiment of the present disclosure. This embodiment is illustrated by taking the mobile phone and a RFID adapter as an example. As shown in FIG. 4, a trigger usually includes an RFID layer and a location circuit. The location circuit is used to record an actual coordinate position of the trigger. The RFID layer is used to constantly send the coordinate position recorded by the location circuit. The positioning adapter at least includes an RFID layer, an A/D codec device and a communication circuit. The RFID layer of the positioning adapter, i.e., the near field communication circuit 21, not only records information such as identity information of users, but also communicates with the RFID layer of the trigger to obtain corresponding position information of the trigger. The position information and the identity information from the near field communication circuit 21 are encoded by the A/D codec device, i.e., the encoder 22, thereby obtaining the encoded information. The encoded information is sent to a communication circuit of the mobile phone through the second communication circuit 23, i.e., communication circuit of the positioning adapter 2. The mobile phone may decode the coded information to obtain the position information and the identity information of the user, thereby achieving accurate positioning of the user.

In some optional embodiments of the present disclosure, the near field communication circuit may communicate through 125 KHz frequency signals. This avoids interference from existing common frequencies, thereby improving accuracy of positioning.

In another some optional embodiments of the present disclosure, as shown in FIG. 1, the positioning adapter may further include at least one auxiliary service circuit 25. The auxiliary service circuit 25 is configured to, based on the identity information and/or the position information, communicate with an auxiliary service device 5 through the near field communication circuit 21. Specific functions of the auxiliary service circuit 25 may be adjusted and designed according to actual scenarios. For example, the auxiliary service circuit 25 may be an electronic lock, and then the positioning adapter may be used to unlock a wardrobe, a cabinet, etc. The auxiliary service circuit may also be used as entrance guard for special departments, etc.

Figure 2:
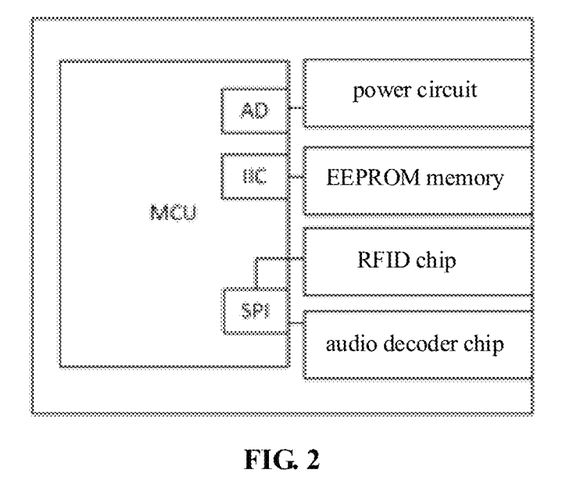
FIG. 2 is a schematic diagram of a positioning adapter including a micro control unit (MCU) according to an embodiment of the present disclosure.

The positioning adapter may include a micro control unit (MCU). FIG. 2 is a schematic diagram of a positioning adapter including the micro control unit according to an embodiment of the present disclosure. As shown in FIG. 2, the positioning adapter further includes a power circuit, an EEPROM memory and an MCU chip. A RFID chip (i.e., the near field communication circuit) and an audio decoder chip (i.e., the encoder) are communicated with the MCU chip. The positioning adapter is powered by the smart device that is connected with the adaptation interface. Then, no additional power is required for the positioning adapter.

As can be seen from the above embodiments, the positioning adapter of one embodiment of the present disclosure is a structure that can be connected with the smart device through the adaptation interface, and then can provide corresponding function modules for the smart device without any changes to the user's smart device. Meanwhile, since the positioning adapter may be customized by indoor companies, the positioning adapter can have sufficient information security, increase or decrease functions and can be upgraded. Further, the positioning adapter may establish a connection with the trigger at one fixed position in indoors and obtain position information of the trigger at the fixed position in indoors, thereby realizing not only accurate positioning in indoors but also sharing of positions of users, and then enabling the user to know situations of other users such as queuing or positions. Therefore, one embodiment of the present disclosure provides a simple and effective positioning solution with comprehensive optimization in cost, accuracy and experience.

Figure 5:
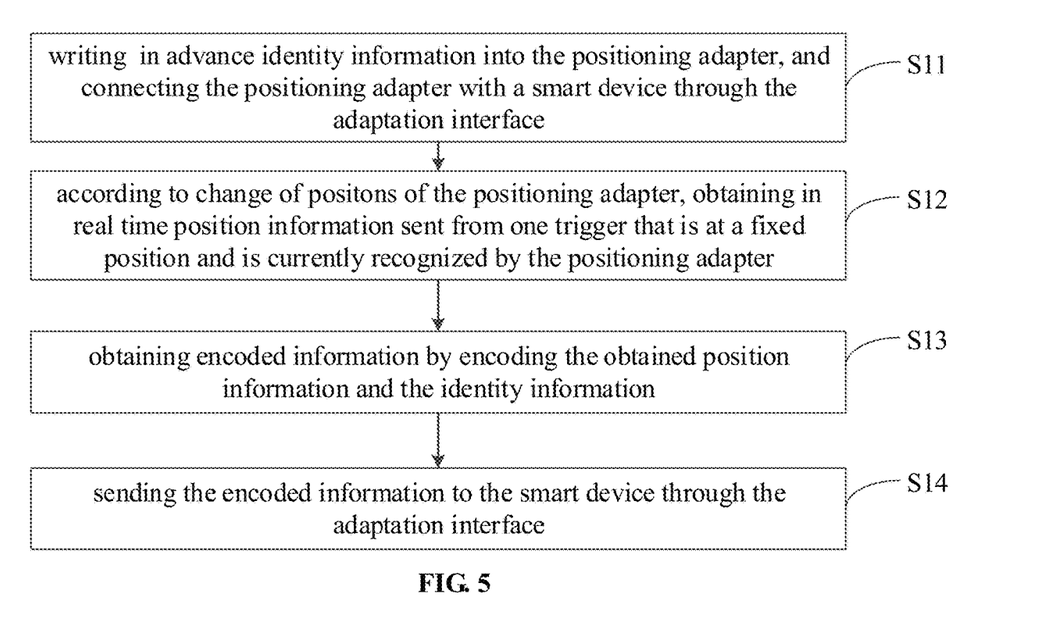
FIG. 5 is a flow chart of a communication method implemented with the positioning adapter according to an embodiment of the present disclosure.

FIG. 5 is a flow chart of a communication method implemented with the positioning adapter according to an embodiment of the present disclosure. As shown in FIG. 5, the communication method includes the following steps.

At step S11, identity information is written in advance into the positioning adapter, and the positioning adapter is connected with a smart device through the adaptation interface.

At step S12, according to change of positions of the positioning adapter, the positioning adapter obtains in real time position information sent from one trigger that is at a fixed position and is currently recognized by the positioning adapter.

At step S13, the obtained position information and the identity information are encoded to obtain encoded information.

At step S14, the encoded information is sent to the smart device through the adaptation interface.

In this way, by connecting the positioning adapter without requiring for an additional signal transmitting device, the communication circuit of the existed smart device can send out and share the corresponding position information. The presence of the triggers at the fixed positions can achieve accurate positioning in indoors without any changes to the user's smart device, with low cost and high information security.

Some optional embodiments of the present disclosure further provide a smart device. The smart device includes a data communication circuit capable of being communicated with the above positioning adapter. The data communication circuit is configured to receive encoded information sent from the positioning adapter and decode the coded information to obtain the corresponding position information and identity information.

Optionally, the data communication circuit may realize the above functions by combining software matching the positioning adapter and the existing smart device.

Some optional embodiments of the present disclosure further provide a server. The server includes a map processing circuit. The map processing circuit is configured to receive the position information and identity information sent from the smart device, obtain a position in an indoor map corresponding to the position information via calculation, update the indoor map and send the updated indoor map to the corresponding smart device.

Figure 6:
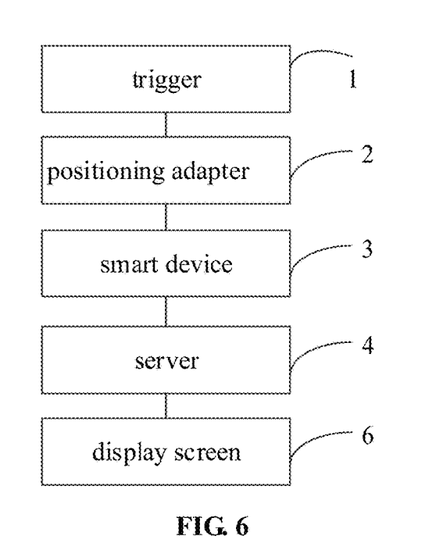
FIG. 6 is a schematic diagram of an indoor positioning system according to an embodiment of the present disclosure.

FIG. 6 is a schematic diagram of an indoor positioning system according to an embodiment of the present disclosure. As shown in FIG. 6, the indoor positioning system includes triggers 1, a positioning adapter 2, a smart device 3 and a server 4.

Each of the triggers 1 is disposed at a fixed position in indoors, and sends out position information corresponding to the fixed position. Optionally, the triggers are disposed at different positions in indoors at an interval in a range of from 1.5 m to 2.5 m. For example, the interval may be 1.5 m, 1.6 m, 1.7 m, 1.8 m, 1.9 m, 2.0 m, 2.1 m, 2.2 m, 2.3 m, 2.4 m, 2.5 m, etc. In this way, according to requirements of positioning accuracy, accurate indoor positioning may be achieved with a few of triggers.

The positioning adapter 2 is configured to receive position information transmitted from the triggers 1 at fixed positions, and send the position information as well as pre-configured identity information to the smart device 3 that is in communication with the positioning adapter 2. The positioning adapter 2 may be the positioning adapter described in any of the above embodiments.

The smart device 3 is configured to receive the position information and the identity information transmitted from the positioning adapter, send the position information and the identity information to the server 4 that is in communication with the smart device 3, obtain an indoor map from the server 4 and display the received position information at the indoor map. The smart device 3 may be the user's own smart device without making changes to the hardware of the user's own smart device, as long as the user's own smart device installs a corresponding installation program or APP that enables the user's own smart device to be communicated with the positioning adapter 2 and the server 4.

Optionally, the smart device may be a mobile phone, the positioning adapter 2 is connected with the user's mobile phone through the audio input interface, and the user's mobile phone is communicated with the server 4. For example, the mobile phone may be communicated with the server 4 through Bluetooth, WiFi or other communication ways.

The server 4 is configured to receive the position information and the identity information transmitted from the smart device 3, update the indoor map based on the received position information and identity information, and send the updated indoor map to smart devices of all users. The updated indoor map includes position information of all the users.

In this way, the triggers 1 can provide position information of the fixed positions in indoors, and then the positioning adapter 2 send the position information to the user's smart device 3, and the smart device 3 communicates with the server 4 so that the smart device 3 can display a current accurate position of the user. Meanwhile, the position information of the user may be shared with other users by the server, then in some indoor places where queues are needed, such as the physical examination center, each user may choose a department with a relatively small number of people to queue up according to their physical examination needs. This can not only optimize the physical examination process and improve utilization of departmental resources, but also save a lot of time of the user for the medical examination.

In some optional embodiments of the present disclosure, the indoor positioning system further includes a display screen 6. The display screen 6 is coupled with the server 4. The display screen 6 is configured to receive the indoor map sent from the server 4 and display the received indoor map. In this way, for individual users who don't take smart devices or just enter into an indoor space, they can know current indoor situations through position information of online users displayed on the display screen 6. This helps the users to arrange their follow-up plan reasonably.

Figure 7:
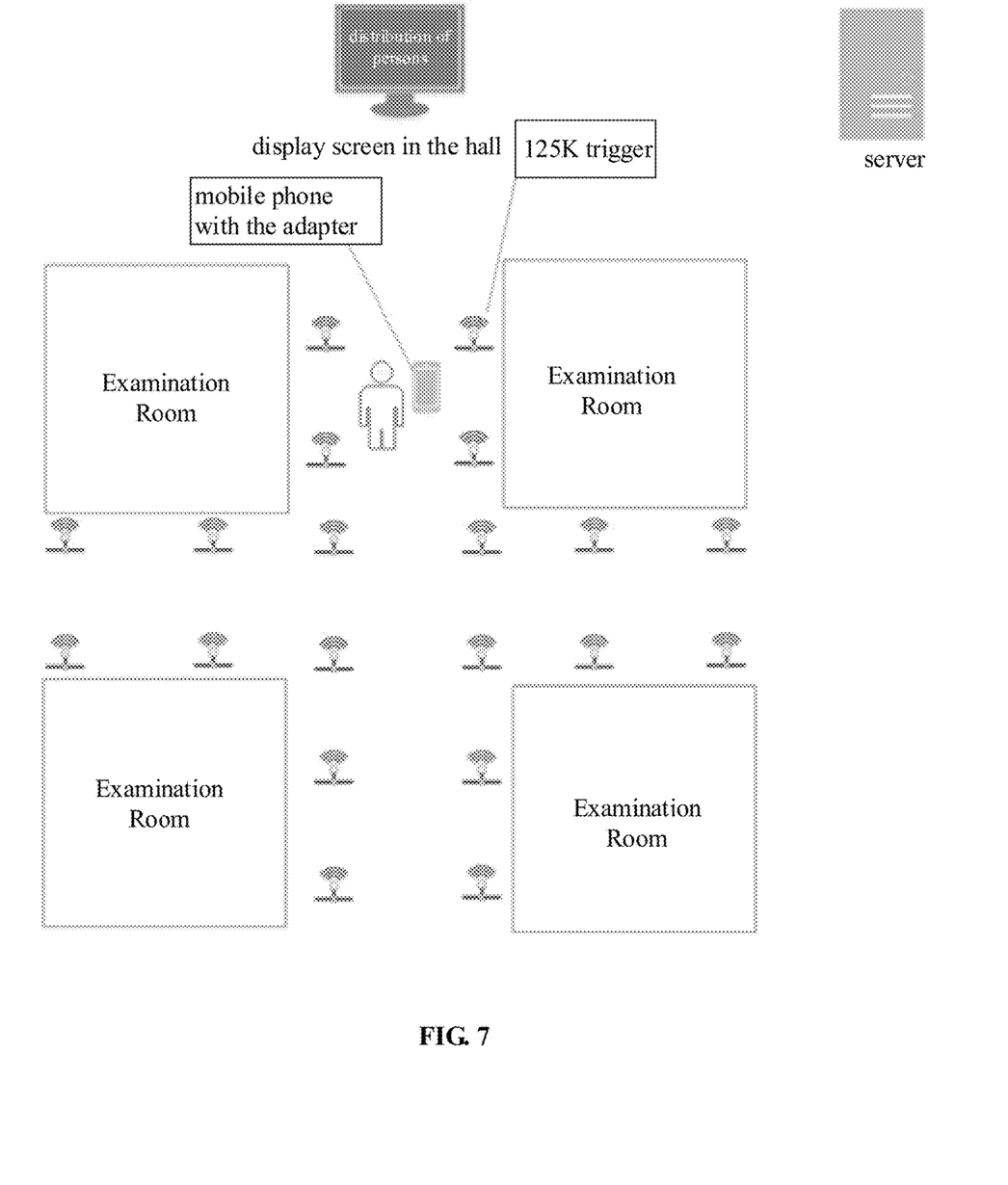
FIG. 7 is a schematic view showing distribution of position devices in a physical examination center or a hospital according to an embodiment of the present disclosure.

FIG. 7 is a schematic view showing distribution of position devices in a physical examination center or a hospital according to an embodiment of the present disclosure. As shown in FIG. 7, several triggers are disposed at a periphery of each department in the physical examination center or the hospital, then when one user takes one mobile phone connected with the positioning adapter, the user can obtain his/her own current position information. Meanwhile, the mobile phone sends the position information of the user to the server, and then the server displays position information of all users through the display screen in a hall for related person to view.

Figure 8:
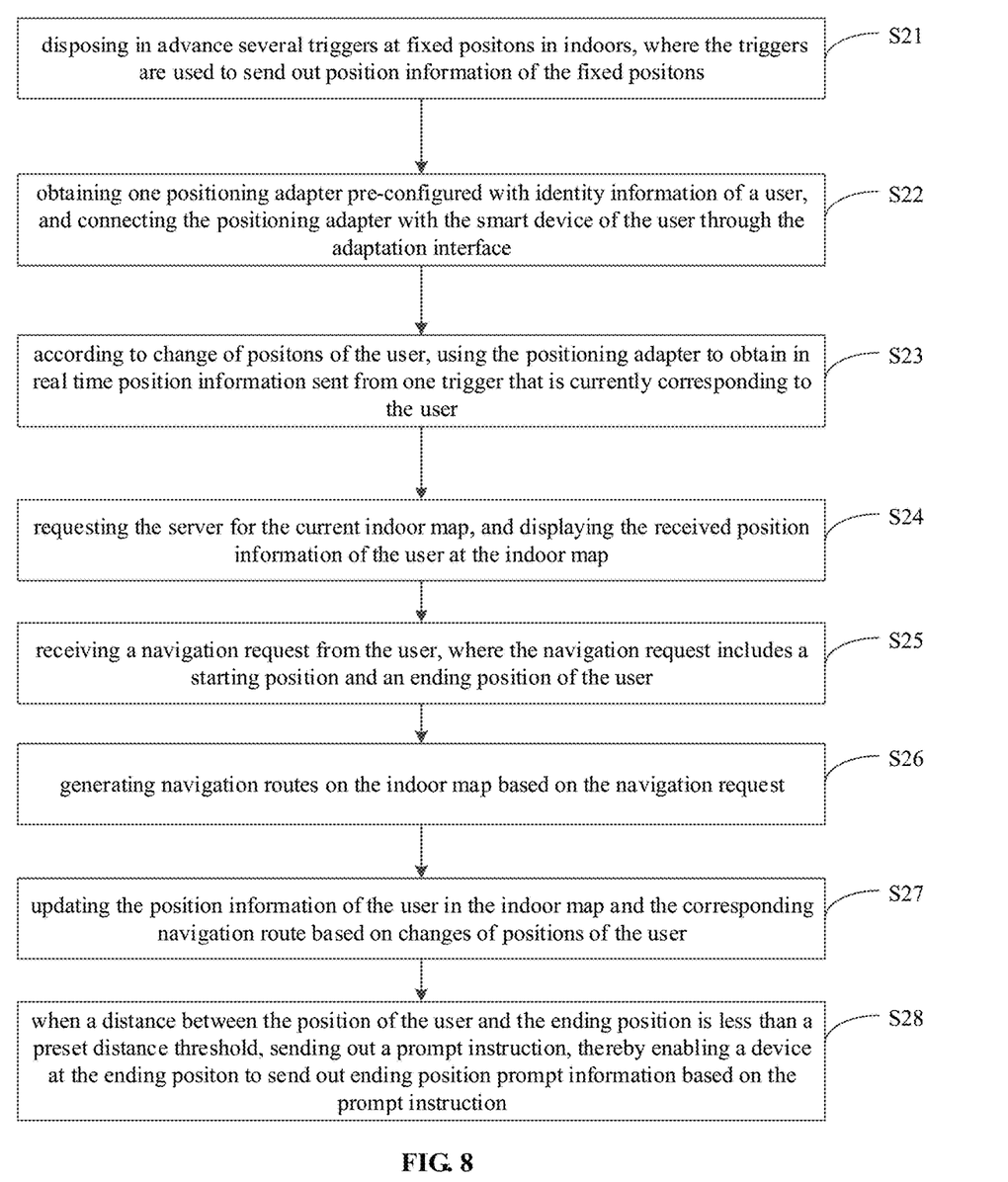
FIG. 8 is a flow chart of an indoor positioning method implemented with a smart terminal according to an embodiment of the present disclosure.

FIG. 8 is a flow chart of an indoor positioning method implemented with a smart terminal according to an embodiment of the present disclosure. As shown in FIG. 8, the indoor positioning method includes the following steps.

As step S21, several triggers are disposed in advance at fixed positions in indoors. The triggers are used to send out position information of the fixed positions.

As step S22, one positioning adapter pre-configured with identity information of a user is obtained, and the positioning adapter is connected with the smart device of the user through the adaptation interface.

At step S23, according to change of positions of the user, the positioning adapter obtains in real time position information sent from one trigger that is currently corresponding to the user.

At step S24, the smart device requests the server for the current indoor map, and displays the received position information of the user at the indoor map.

In this way, cooperation of the position adapter and the triggers can achieve accurate positioning of the user and display the position information of the user in real time through the indoor map.

Further, when considering that the user may need to go a specified target place, the indoor positioning method further includes the following steps.

At step S25, the smart device receives a navigation request from the user. The navigation request includes a starting position and an ending position of the user, and the user is capable of selecting different starting positions and different ending positions.

At step S26, the smart device generates navigation routes on the indoor map based on the navigation request.

At step S27, the smart device updates the position information of the user in the indoor map and the corresponding navigation route based on changes of positions of the user.

At step S28, when a distance between the position of the user and the ending position is less than a preset distance threshold, a prompt instruction is sent out, thereby enabling a device such as an indicator or a loudspeaker at the ending position to send out ending position prompt information based on the prompt instruction. The prompt instruction may be directly sent to the device at the ending position from the smart device. The prompt instruction may also be sent to the device at the ending position from the server based on the position information or prompt information sent from the smart device.

In this way, it not only enables the user to navigate indoors, but also prompts the user of reaching the ending position by means of prompt information sent from the device corresponding to the ending position. For example, when the ending position is a cabinet, the cabinet corresponding to the user may light up the indicator or sound a warning to prompt the user, thereby enabling the user to quickly and accurately find the target position.

Figure 9:
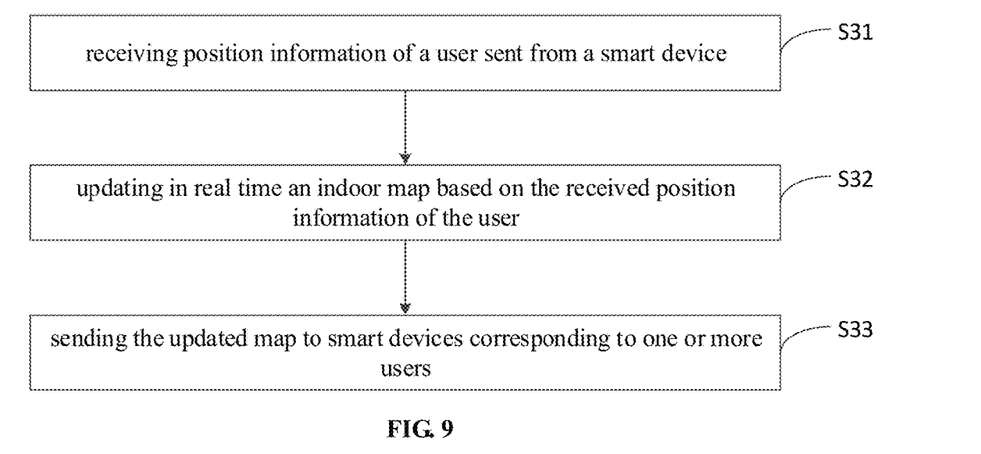
FIG. 9 is a flow chart of an indoor positioning method implemented with a server according to an embodiment of the present disclosure.

FIG. 9 is a flow chart of an indoor positioning method implemented with a server according to an embodiment of the present disclosure. As shown in FIG. 9, the indoor positioning method includes the following steps.

At step S31, the server receives position information of a user sent from a smart device.

At step S32, the server updates in real time an indoor map based on the received position information of the user. The updated indoor map includes the position information of the user.

At step S33, the server sends the updated map to smart devices corresponding to one or more users. Herein, the one or more users mean that the current user may specify only one user or several users to receive the updated map including the position information of the current user, or mean that the position information of the current user is sent to all users.

In this way, by means of communication between the server and the existed smart device of the user, this not only realizes real-time updating of the position of the user on the indoor maps, but also allows real-time sharing of the position of the current user to smart devices of other users, thereby providing the users with better indoor positioning experience.

Figure 10:
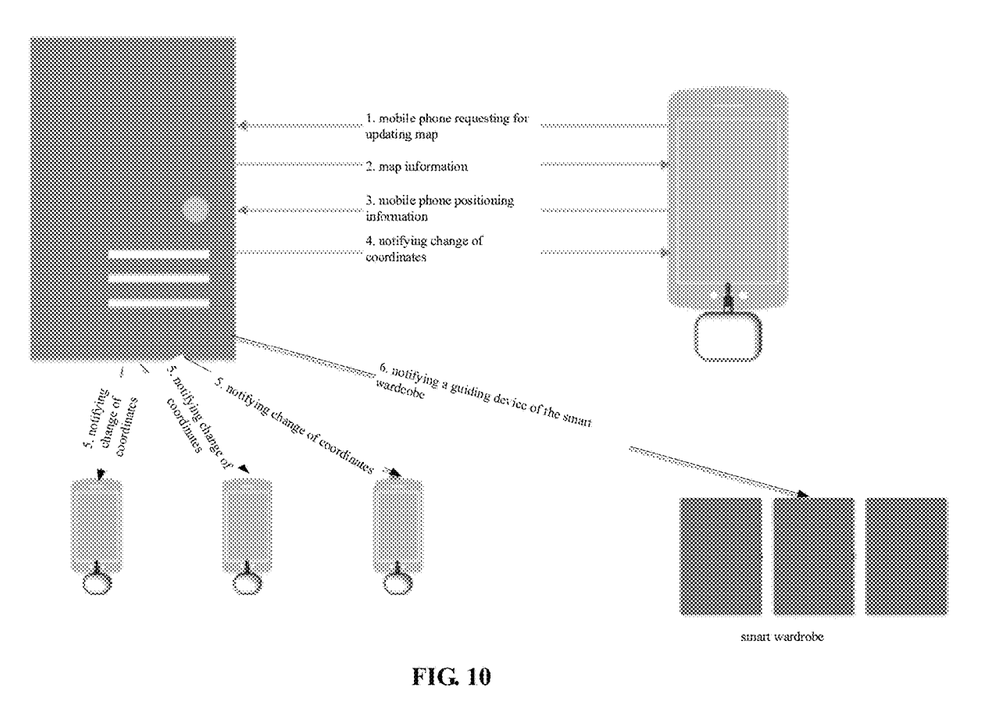
FIG. 10 is a schematic view of a communication model between a mobile phone and a server according to an embodiment of the present disclosure.
Figure 11:
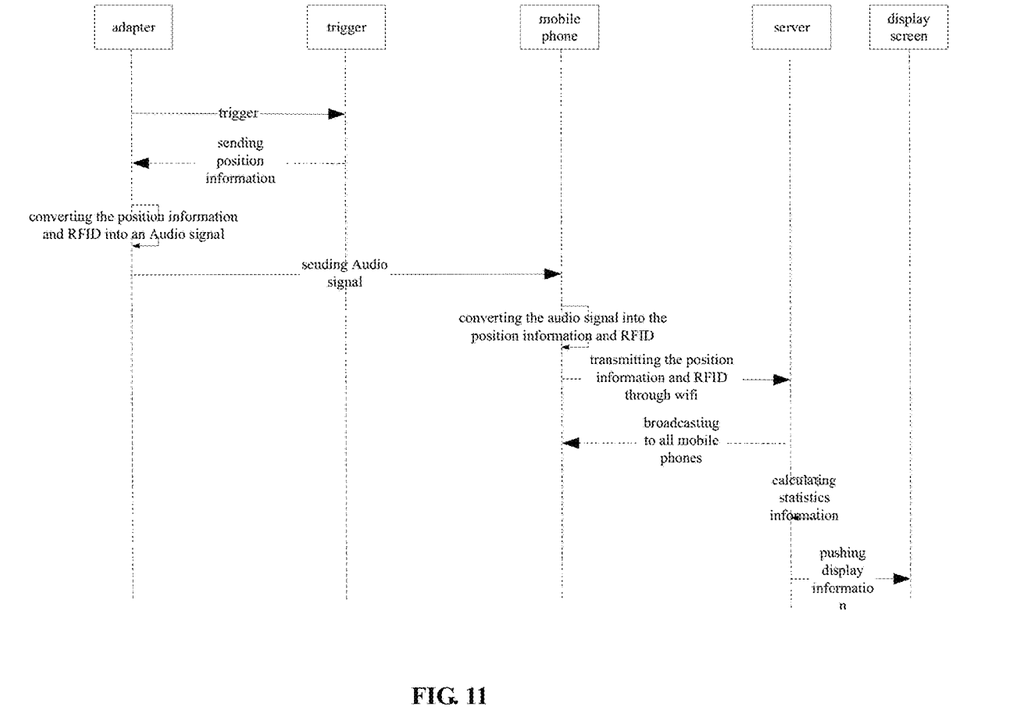
FIG. 11 is a communication timing diagram corresponding to an indoor positioning method according to an embodiment of the present disclosure.

FIG. 10 is a schematic view of a communication model between a mobile phone and a server according to an embodiment of the present disclosure. FIG. 11 is a communication timing diagram corresponding to an indoor positioning method according to an embodiment of the present disclosure. Referring to FIG. 10 and FIG. 11, when the smart device is a mobile phone and the mobile phone is communicated with the server, the mobile phone sends a request for downloading a map to the server. The server sends the latest map to the mobile phone for updating. When the mobile phone is moved into a signal range of one trigger, the mobile phone receives position information and identity information from the positioning adapter. The mobile phone packages the position information and identity information in a position update message, and sends the position update message to the server. The server records the position update message, obtains coordinates in the map via calculation, and then sends the position information and the map to all mobile phones communicated with the server. The mobile phone may mark the position of the positioning adapter in the map.

Further, when the user needs to be guided to a smart wardrobe, the server may send information to a communication circuit of the smart wardrobe corresponding to the user, thereby enabling the smart wardrobe to light up the indicator to guide the user. Then, the user may unlock the electronic lock through the RFID of the positioning adapter. In this way, accurate guidance and processing of additional services can be achieved, thereby improving the user's experience.

As can be seen from FIG. 11, first, the user takes the mobile phone with the positioning device into the signal range of the trigger, and then the trigger is triggered to send position information to the positioning adapter. After that, the positioning adapter converts the position information and the identity information of the user into an audio signal and sends the audio signal to the mobile phone. A decoding circuit of the mobile phone decodes and transforms the audio signal to obtain the position information and the identity information of the user. Then, the mobile phone sends the position information and the identity information of the user to the server. The server calculates a position according to the received position information and sends the calculated position to all mobile phones, and pushes the calculated position to the display screen for displaying.

In some optional embodiments of the present disclosure, an example of taking the physical examination center or the hospital as the indoors is described below. First, triggers of 125 KHz are distributed in corridors of the physical examination center or the hospital at an interval in a range of from 1.5 m to 2.5 m. When one user is in the physical examination center or the hospital for registration, the user gets one positioning adapter that binds identity information of the user, and connects the positioning adapter to the mobile phone of the user, and then goes to see a doctor. The positioning adapter connected with the mobile phone is positioned by the triggers distributed in the corridors, and position information and the identity information of the user are transmitted in real time by the mobile phone to the server. Finally, the server sends the position of the user to mobile phones of all users for displaying. Meanwhile, the server uploads statistics information processed in the background to the display screen in the hall. More specifically, by taking the physical examination center as an example, one process of realizing positioning and navigation is described below.

(1) When one user registers, customer information is bound to one positioning adapter at the physical examination center, and the user gets the positioning adapter as well as a registration form.

(2) The user inserts the positioning adapter into an audio input interface of the user's mobile phone.

(3) The user opens a mobile phone App or an official account of the physical examination center and accesses a map module so that the user can see distribution of all users that are using the positioning adapters, thereby facilitating checking which physical examination item with a relatively small number of people now.

(4) The user may select one place such as a department, a toll office or a bathroom, and then click navigation for performing indoor navigation and real-time positioning of a position of the user.

(5) Coordinates of the user are transmitted to the server, processed by the server and then displayed on the display screen in the hall. Newcomers can easily view this information. Meanwhile, administrators can also use this information to do big data analysis.

(6) The coordinates of the user may be broadcasted by the server to all mobile phones with the mobile App, and then an identical distribution of persons in the map is displayed for all users.

(7) When the user walks to near wardrobes, the positioned position information and the identity information of the user are sent to the server, and then the server guides the user to find the user's wardrobe by lighting up the indicator at the user's wardrobe. Then the user can unlock the user's wardrobe by using the positioning adapter to contact the electronic lock.

From the above embodiments, the positioning adapter, the communication method, the indoor positioning system and method have the following effects.

(1) By utilizing the audio input interface such as the auto input interface of the mobile phone, universality and compatibility can be guaranteed. Since the mobile phone of the user is usually provided with the audio input interface, the positioning adapter is easily and quickly inserted to the audio input interface, i.e., plug and play, and it is only needed to install App into the mobile phone without adding new hardware to the mobile phone on the market.

(2) The information security of the hospital or the physical examination center can be guaranteed. The various hospitals or physical examination centers may customize their own positioning adapters, thereby ensuring closeness of the positioning adapters and avoiding information leakage.

(3) The positioning adapter requires for no battery to be installed, and may be powered through the auto input interface of the mobile phone, while devices that use RFID for active positioning mostly adopt an active mode, which requires for additional batteries to be installed and is easy to cause waste of energy.

(4) By connecting the positioning adapter to the smart device such as the mobile phone, the positioning information may be transmitted to the server through 4G and WiFi signals of the mobile phone, without deploying such transmitters separately. Since commonly used RFID positioning devices such as door cards and hand rings do not have network transmission modules, gateways are needed to be set up separately to cooperate with these devices to send location information to the server; while the present disclosure use the mobile phone to complete these functions, thereby reducing cost and reducing complexity.

(5) Using 125 KHz RFID as positioning mode, the interference is relatively small and the positioning accuracy is greatly improved, for example, the positioning accuracy of about 1 m is guaranteed without large jump which is occurred when using WiFi and Bluetooth for positioning.

(6) The server can ensure that synchronization and real-time positioning of mobile phones in the positioning place, and each mobile phone with the App can clearly see the current queue or the distribution of persons.

(7) The positioning adapter may be customized by indoor companies such as the hospital, and the auxiliary service circuit may be added according to needs. For example, the positioning adapter may be combined with the electronic lock of the storage cabinet, or guide users to find their wardrobes by positioning information. Comparing with most medical centers in the past, patients are given a bracelet to open wardrobes, the positioning adapter of the present disclosure can use its RFID to unlock the lock, which is convenient and fast. Further, the positioning adapter may be cooperated with a detection device of medical equipment, thereby facilitating medical staff to register patient information and other operations and improving efficient. Comparing with traditional medical devices such as bracelets, the combination of the mobile phone and the positioning adapter can transmit in real time the position information or identity information of physical examinees to the server, thereby facilitating the administrators to make statistics and supporting decision-making based on this information.

The various embodiments in the present disclosure are described in a progressive manner, and each embodiment focuses on differences from other embodiments, and the same similar parts between the various embodiments may be referred to each other.

In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two.

In the above description of the present disclosure, reference to "an embodiment," "some embodiments," "one embodiment", "another example," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A positioning adapter capable of being connected with a smart device, comprising:
    a first communication circuit;
    an encoder;
    a second communication circuit; and
    an adaptation interface;
    wherein the first communication circuit is configured to receive position information, and send the position information to the encoder;
    the encoder is configured to receive the position information, obtain encoded information that matches the smart device by encoding the position information, and send the encoded information to the second communication circuit;
    the second communication circuit is configured to receive the encoded information and transmit the encoded information to the smart device through the adaptation interface; and
    the adaptation interface is configured to connect the positioning adapter with the smart device, and communicate with the smart device through the second communication circuit.

2. The positioning adapter of claim 1, wherein the first communication circuit is further configured to send the position information as well as identity information to the encoder; and
    the encoder is further configured to receive the identity information, obtain encoded information that matches the smart device by encoding the position information and the identity information, and send the encoded information to the second communication circuit.

3. The positioning adapter of claim 2, wherein the first communication circuit is a near field communication circuit; the near field communication circuit is configured to receive position information transmitted from triggers at fixed positions and send the position information as well as identity information to the encoder.

4. The positioning adapter of claim 3, wherein the adaptation interface is an interface configured to engage with an audio input interface.

5. The positioning adapter of claim 3, wherein the near field communication circuit communicates through 125 KHz frequency signals.

6. The positioning adapter of claim 3, further comprising at least one auxiliary service circuit;
    wherein the at least one auxiliary service circuit is configured to, based on at least one of the identity information and the position information, communicate with an auxiliary service device through the near field communication circuit.

7. The positioning adapter of claim 6, wherein the auxiliary service circuit is an electronic lock.

8. The positioning adapter of claim 3, wherein the identity information is a fixed number or user-related information written through a flashing device.

9. The positioning adapter of claim 3, wherein the positioning adapter includes a micro control unit.

10. The positioning adapter of claim 3, wherein the positioning adapter is powered by the smart device that is connected with the adaptation interface.

11. A communication method implemented with the positioning adapter of claim 3, comprising:
    writing identity information into the positioning adapter, and connecting the positioning adapter with a smart device through the adaptation interface;
    according to change of positions of the positioning adapter, obtaining in real time position information sent from one trigger that is at a fixed position and is currently recognized by the positioning adapter;
    obtaining encoded information by encoding the position information and the identity information; and
    sending the encoded information to the smart device through the adaptation interface.

12. A server comprising a map processing circuit;
    wherein the processing circuit is configured to receive position information and identity information sent from a smart device connected with the positioning adapter of claim 1, obtain a position in an indoor map corresponding to the position information via calculation, update the indoor map and send the updated indoor map to the corresponding smart device.

13. An indoor positioning method implemented with a smart device, comprising:
    disposing several triggers at different fixed positions in indoors, wherein the triggers are configured to send out position information of the corresponding fixed positions;
    obtaining the positioning adapter of claim 1, the positioning adapter configured with identity information of a user, and connecting the positioning adapter with the smart device of the user through the adaptation interface;
    according to change of positions of the user, obtaining in real time, by the positioning adapter, position information of one trigger that is currently corresponding to the user, thereby obtaining position information of the user;

requesting a server for a current indoor map, and displaying the position information of the user at the indoor map.

14. The method of claim 13, further comprising:
receiving a navigation request from the user, wherein the navigation request includes a starting position and an ending position of the user;
generating navigation routes on the indoor map based on the navigation request;
updating the position information of the user in the indoor map and the corresponding navigation route based on changes of positions of the user;
when a distance between the position of the user and the ending position is less than a distance threshold, sending out a prompt instruction that enables a device at the ending positions to send out ending position prompt information based on the prompt instruction.

15. The method of claim 14, wherein when a distance between the position of the user and the ending position is less than a distance threshold, sending out a prompt instruction that enables a device at the ending positions to send out ending position prompt information based on the prompt instruction, includes:
when the distance between the position of the user and the ending position is less than the distance threshold, sending out the prompt instruction that enables an indicator or a loudspeaker at the ending positions to send out the ending position prompt information based on the prompt instruction.

16. An indoor positioning system comprising:
triggers;
a positioning adapter;
a smart device in communication with the positioning adapter; and
a server in communication with the smart device;
wherein each of the triggers is disposed at a fixed position in indoors and is configured to send out position information corresponding to the fixed position;
the positioning adapter is configured to receive the position information transmitted from one of the triggers, and send the position information as well as identity information to the smart device that is in communication with the positioning adapter;
the smart device is configured to receive the position information and the identity information transmitted from the positioning adapter, send the position information and the identity information to the server, obtain an indoor map from the server and display the position information at the indoor map;
the server is configured to receive the position information and the identity information transmitted from the smart device, update the indoor map based on the position information and identity information with an updated indoor map obtained, and send the updated indoor map to the smart device;
the updated indoor map includes the position information corresponding to the smart device.

17. The system of claim 16, further comprising a display screen;
wherein the display screen is coupled with the server; the display screen is configured to receive the indoor map sent from the server and display the indoor map.

18. The system of claim 16, wherein the smart device is a mobile phone; the positioning adapter is connected with the mobile phone through an audio input interface; and the mobile phone is in communication with the server.

19. The system of claim 16, wherein the triggers are disposed at different positions in indoors at an interval in a range of from 1.5 m to 2.5 m.

20. An indoor positioning method implemented with the server of claim 16, comprising:
receiving position information of a user sent from a smart device;
updating in real time an indoor map based on the position information of the user with an updated indoor map obtained, wherein the updated indoor map includes the position information corresponding to the smart device; and
sending the updated indoor map to one or more smart devices.

* * * * *